United States Patent [19]

Proudfoot

[11] Patent Number: 4,813,490
[45] Date of Patent: Mar. 21, 1989

[54] SOIL DRESSING TOOL WITH TINES HAVING CURVED BOTTOM EDGES

[75] Inventor: Glenn C. Proudfoot, Calgary, Canada

[73] Assignee: United Stockmen Corporation, Calgary, Canada

[21] Appl. No.: 35,040

[22] Filed: Apr. 6, 1987

[30] Foreign Application Priority Data

Jan. 23, 1987 [CA] Canada ................... 528056

[51] Int. Cl.$^4$ .............................................. A01B 1/20
[52] U.S. Cl. ................................ 172/378; 56/400.07; 273/32 B
[58] Field of Search ...................... 172/375, 378, 379; 273/32 B; 56/400.04, 400.05, 400.07, 400.11, 400.21

[56] References Cited

U.S. PATENT DOCUMENTS

| D. 28,490 | 4/1898 | Ludwick ................................. D8/6 |
| D. 265,168 | 6/1982 | Zabarte ................................... D8/6 |
| 1,899,414 | 2/1933 | Gray ................................... 56/400.07 |
| 3,408,803 | 11/1968 | Vanderveer ................. 56/400.07 X |

FOREIGN PATENT DOCUMENTS

| 596743 | 3/1978 | Switzerland ...................... 56/400.07 |
| 498694 | 1/1939 | United Kingdom .............. 56/400.07 |

Primary Examiner—Richard T. Stouffer
Attorney, Agent, or Firm—Albert L. Jeffers

[57] ABSTRACT

A soil dressing implement useful as a sand trap rake, the head thereof including a transverse body portion with plurality of tines and a vane extending across the rear of the tines for the full width of the head. The tines, which are laterally spaced, have a downwardly and rearwardly sloped front edge merging into a rearwardly and downwardly curved bottom edge. The bottom edge curves slightly upward at the rear and terminates at a lower edge of the vane. The vane has a front flat surface which slopes downwardly and forwardly towards the lower edge thereof. The transverse body has a top surface having a rear edge which is forward of the bottom edges of tines when the implement is lying on its back. The implement has better raking characteristics than known devices because the front sloped surface of the vane has a tendency to pull the tines down into the sand and to distribute the sand which then flows between the tines and spills over the upper edge of the vane so as to not leave any tine marks. Because of the smoothly curved edges of the tines and the manner in which the vane is disposed, no sharp edges are exposed when the implement is left up-side-down on the ground. When pressure is applied to the bottom of the tines by one's foot, the head pivots about the rear edge of the main body portion of the head to cause the handle to swing to an almost upright position before the vane engages the ground to terminate the pivoting action at a position in which the handle can be conveniently grasped.

8 Claims, 5 Drawing Sheets

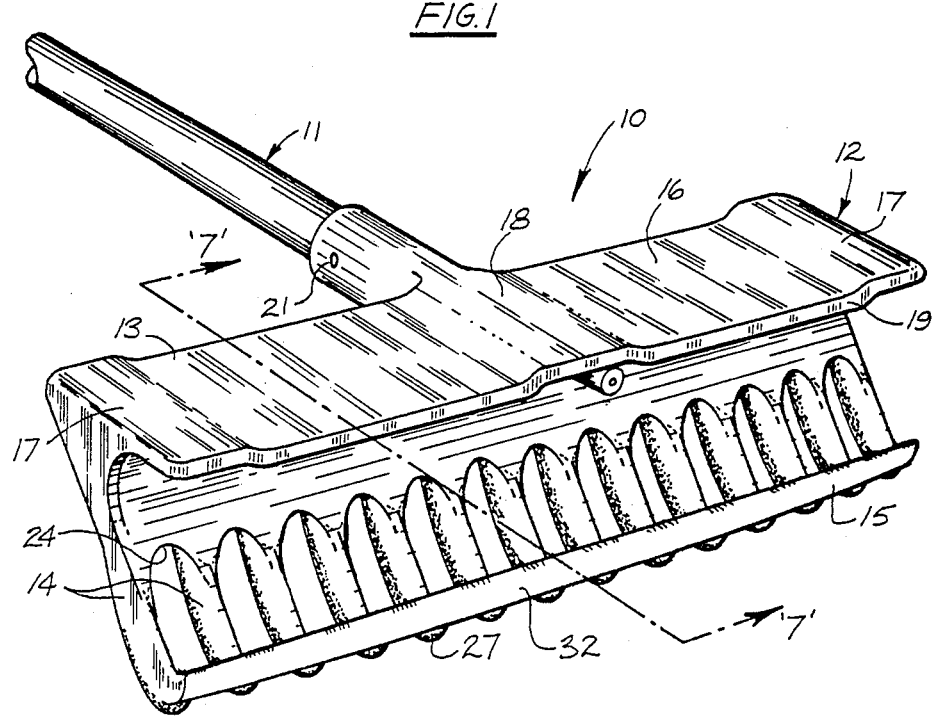
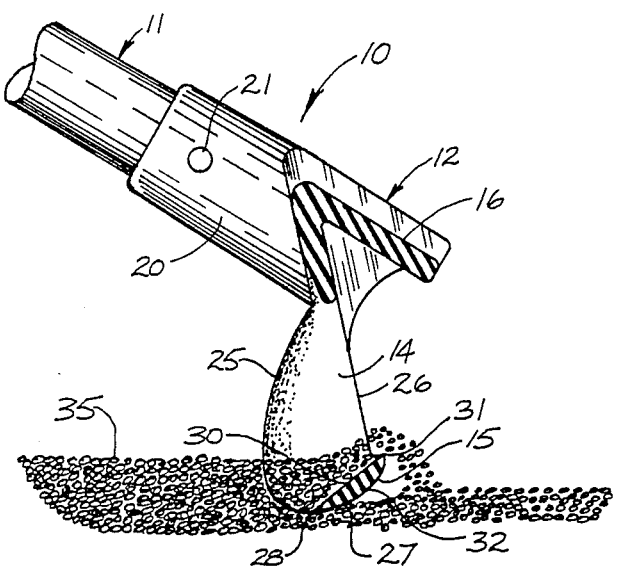

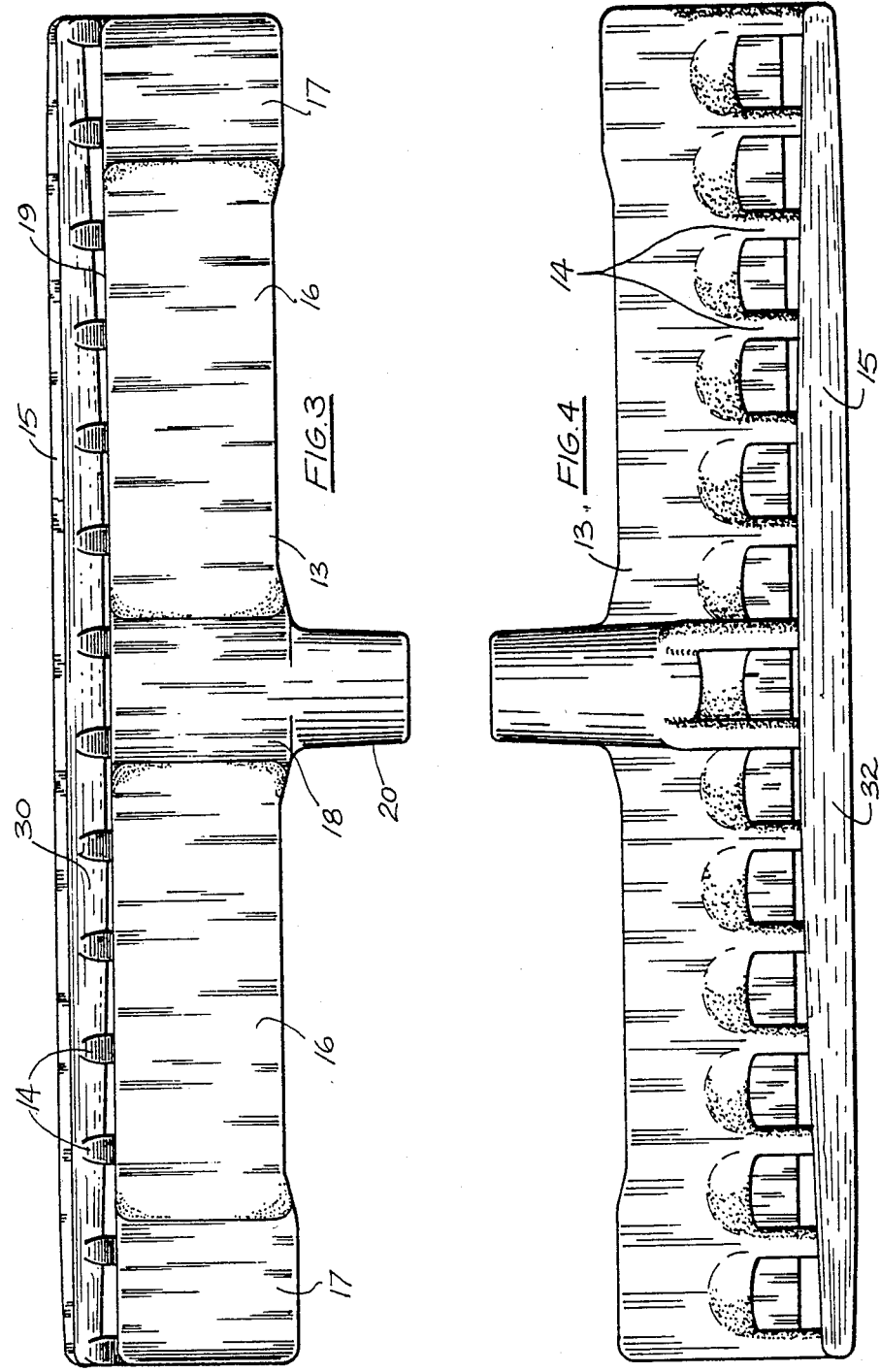

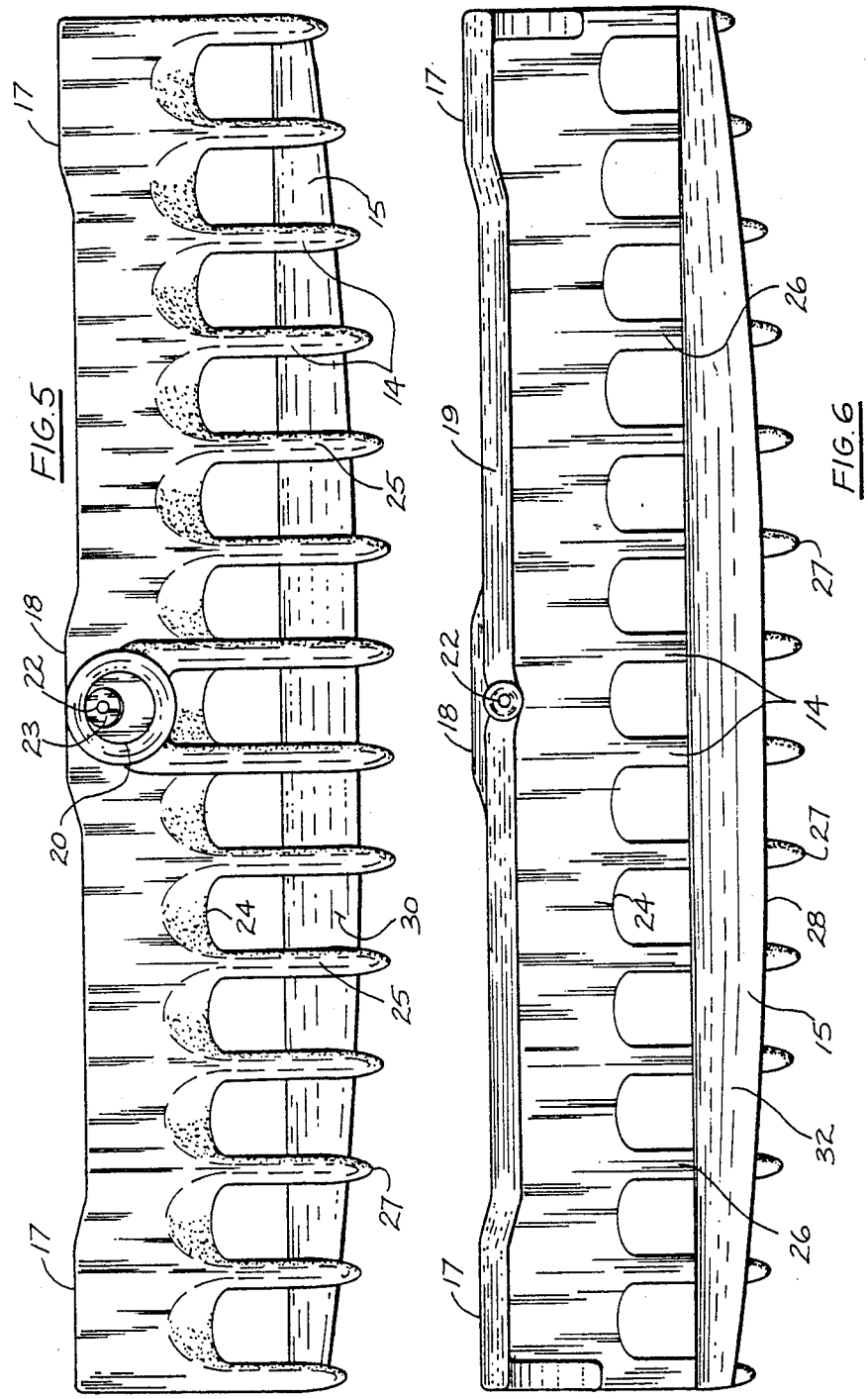

SOIL DRESSING TOOL WITH TINES HAVING CURVED BOTTOM EDGES

BACKGROUND OF THE INVENTION

This invention relates to a soil dressing device, and more particularly to a rake type implement useful for smoothing sand bunkers on a golf course.

In the sport of golf, said bunkers are strategically located within the fairway to enhance the challenge of the game. Customary to the rules and etiquette of the game, it is the responsibility of a player who has to play out of a sand bunker to fill up and smooth over all holes, marks, and foot prints made by him before leaving the bunker. Depending on the size of the bunker, 1 to 4 sand trap rakes may be left around the hazard for the convenience of the players. The placement of the rakes, whether lying inside or outside of the bunker, or standing outside of the bunker, is usually dependent on the regulations established by the authorities for each particular course. It is, of course, the object of the golf course superintendent to provide a sand trap repair implement which minimizes the interference with the golf play and enhances the speed and pleasure of the play. Available sand trap rakes are in some cases very similar in design to normal garden rakes and are not especially effective in leveling or filling in holes or marks in the trap, and/or they tend to leave tine marks in the sand. Even the rakes, which have a more radical design for sand trap use, do not appear to have obtained any commercial success, probably because of their cumbersome nature or simply because they have not proven to be any more convenient or effective in leveling the disturbed areas without leaving noticeable marks in the worked area of the sand trap.

SUMMARY OF THE INVENTION

It is an object of the present invention to provide an implement which is capable of smoothly dressing soil surface or the surface of a sand trap with a minimum of effort.

According to one aspect of the present invention, there is provided an implement, the head of which includes a transverse body portion, a plurality of downwardly projecting, laterally spaced tines, and a transverse vane. The vane has a lower edge behind the tines and a sloped front surface extending upwardly and rearwardly from the lower edge and terminating in an upper edge which is located a distance below the body portion. The vane pulls the implement down into the sand, helps distribute the sand, and as the sand spills over the upper edge of the vane, it provides a worked area without tine marks.

According to another aspect of the invention, the head of the implement includes a transverse body portion having a top surface terminating in a rear edge, and a plurality of tines extending downwardly from the head, the tines have a curved bottom edge, the tines projecting upwardly of said body portion and the curved bottom edges being rearward of the rear edge of the top surface of the body portion when said implement is lying on the ground in an up-side-down position with the handle extending forwardly of the body portion. Thus, as a downward pressure is applied by one's foot to the curved bottom edges of the tines when the implement is in said position, the implement is caused to pivot to an upright position so that the handle can be conveniently grasped.

BRIEF DESCRIPTION OF THE DRAWINGS

In the accompanying drawings, which show one embodiment of the invention, as an example;

FIG. 1 is a perspective view of the implement of the present invention;

FIG. 3 is a top view of the implement of FIG. 1;

FIG. 4 is a bottom view of the implement of FIG. 1;

FIG. 5 is a front view of the implement of FIG. 1;

FIG. 6 is back view of the implement of FIG. 1;

FIG. 7, which is on the same sheet as FIG. 1, is a sectional view as seen from the line 7—7 of FIG. 1, but with the implement disposed in a working position;

DESCRIPTION OF THE INVENTION

Figure 8:
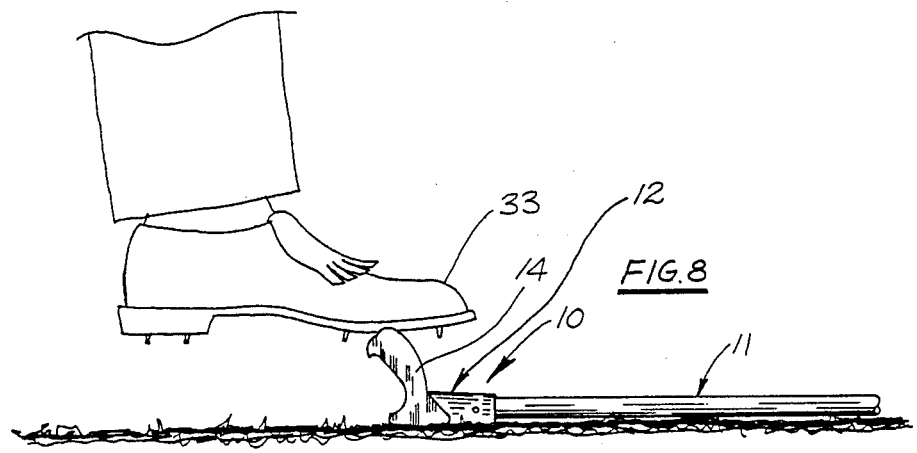
FIG. 8 is a side view of the implement of FIG. 1 shown lying on the ground in a position it would normally occupy when not being used.

The reference number 10 generally denotes the soil dressing implement of the present invention, the implement 10 including a handle 11 and head 12. The head 12 includes a main transversely extending body portion 13, downwardly extending tines 14 and a rear blade or vane 15. For the sake of clarity in initially describing the orientation of the parts of the head 12 relative to the vertical and horizontal, the head will be assumed to be in the position shown in FIG. 2, but it will be appreciated that in normal use of the implement, it is usually in the approximate position shown in FIG. 7 wherein there is shown a horizontal soil surface 35 in conjunction with which the implement is being used. Whereas the handle extends in a horizontal orientation in FIG. 2, the handle 11 would extend at approximately 30° relative to the ground surface during normal use. As is illustrated in FIG. 8, the implement is designed so that it can be left in an up-side-down position, say on the ground adjacent or or in the sand trap, with the handle lying in a flat horizontal position on the ground, when the implement is not being used.

The entire head 12, including the body portion 13, tines 14 and vane 15, may be moulded as a single unit of a plastic material, such as polypropylene, which may include an ultra violet stabilizer and a colouring agent. Such a head is satisfactory for an implement which is to be used as a sand trap rake as it is resistant to damage by spiked footwear, cart traffic and the abrasive nature of sand. If designed as a garden rake, which might be used in a heavier soil condition, it would be preferable to form the rake by way of a metal casting or other acceptable process. The handle 11 may be formed of fiberglass which is resistant to weather deterioration, splintering or crushing.

Figure 2:
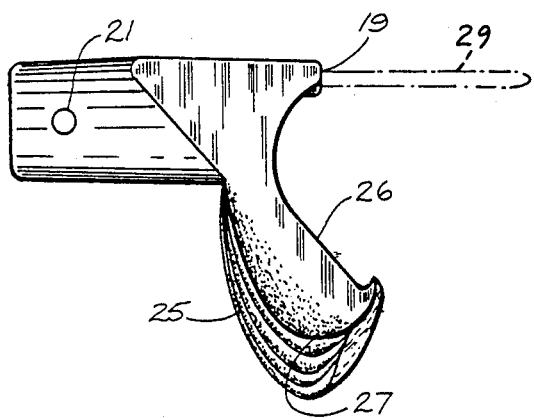
FIG. 2 is a side view of the implement of FIG. 1.

As viewed in FIGS. 2, 5 and 6, the main body portion 13 has a narrow transversely extending flat top surface 16 with raised portions 17, 17 at opposite ends thereof. The surface 16 also has a tightly raised central portion 18 from which a forwardly projecting handle socket 20 is formed. The handle socket 20 is of hollow cylindrical configuration. When the head is formed of plastic as described above, the interior of the socket and the handle may be selected so that the handle can be simply pushed into the socket when it becomes desirable to assemble the implement, and due to the resilience of the material, the handle is held in place without further fastening means. The socket 20 may be formed with a transverse bore 21, however, so that a bolt rivet or other means (not shown) can extend through the socket and also an aligned transverse bore in the inner end of the handle. A rear edge 19 of the surface 16 is located well behind the socket 20.

As it is the requirement at some golf sources for the sand trap rake to be left in a standing position, the rear of the socket 20 may be provided with a small bore 22, which may, in a rearward direction, be inclined in a slightly upward direction relative to the central axis of the handle. A counterbore 23 (FIG. 5) is provided at the inner end of the bore 22. Thus, a stainless steel, headed spike as shown in broken lines in FIG. 2 may be provided for the rake so that the spike may be inserted outwardly from within the socket prior to inserting the handle into the socket. Thus as the head of the spike is received in the counterbore 23, the spike is held in place by the handle, and the outer sharp end of the spike projects from the back of the rake well past the rear edge 19. As the spike is pushed vertically into the ground the implement is held in a position with the handle projecting upwardly. In this upright position, the rear edge 19 of the upper part of the head and the vane 15 are in engagement with the ground surface along two spaced lines.

As may be readily observed from FIGS. 1, 5 and 6, the teeth or tines 14 have considerable depth, i.e., in the fore and aft direction, relative to their width, i.e., in the transverse direction. The tines are separated in the transverse direction by a distance several times each tine width. Rather being rectangular in cross section the tines are tapered in thickness towards a front edge 25 and a lower edge 27 and also toward a rear edge 26, the taper providing a sharper edge at the front and bottom edges than at the rear edge. The main body portion curves downwardly to each tine in the transverse direction so as to provide an arched effect 24 above the space between adjacent tines, as viewed from the front and back. The depth of each in the fore tine is defined between front edge 25 and rear edge 26 of the tine. The front edge 25 of the tines depart from the main body portion thereof adjacent the front of the main body portion and extends downwardly and rearwardly to the lowermost edge 28 of the vane. The lowermost edge 27 curves smoothly from the front edge 26 downwardly, rearwardly and slightly upward to a lower edge 28 of the vane 15. The rear edge 26 of the tine joins the main body portion ahead of the rear edge 19 of the top surface thereof. The rear edge 26 also is inclined in a rearward and downward direction and intersects a front surface 30 of the vane 15 slightly below an upper edge 31 of the vane 15. The tines are thus integrally formed with the vane and connect thereto slightly behind the lowermost edge of the tines.

As best seen in FIG. 4, the two centre incline outward from the handle socket and function to reinforce the connection of the handle to the head. The front edges of the other tines may be in a common plane and the rear edges of all the tines may also be in a common plane. Alternatively, as shown in the illustrated embodiment, the profile of the tines at the centre may be larger than toward either side, i.e., the profile slightly decreases from tine to tine from the centre toward each side. Thus, a tine which is closer to the centre has the front edge 25 thereof slightly preceding the front edge of the tine immediately to the outside thereof and its bottom edge 27 is slightly deeper than the bottom edge of tine on its outside. The front surface 30 of the vane 15 is flat, but it has an arcuate rear surface 32 which forms a continuation of the curve of the bottom or lower edge 27 of the tines (see FIG. 2). The intersection of the flat front surface and the curved rear surface of the vane provides a sharp cutting edge at the lower edge 28 of the vane. The vane is of varying cross section, ever decreasing from the centre thereof towards either side end. The rate of variation is selected so that the lower edge is curved to match the varying depth of the tines, as is most apparent in FIGS. 5 and 6. As can be seen in FIG. 2, the front surface of the vane slopes upwardly and rearwardly at a relatively sharp angle, say about 75°, so that the lower edge 28 is somewhat ahead of the upper edge 31.

When the implement is in use, the handle is held at an angle of about 30° as shown in FIG. 7. The bottom edges 27 of the tines 14 are sufficiently below the lower edge of the vane 15 that they remain below the vane when in the operative position (FIG. 7). It can be seen, however, that when the implement is being used, the angle of the front surface 30 of the vane is disposed at an angle of about 45° relative to the horizontal.

As the implement is pulled forward to rake the sand in a trap, for example, the sharp lower edge of the vane cuts down into the sand and the sloped front surface of the vane pulls the vane and tines down into the sand so that the user does not have to apply much downward pressure on the handle. The fact that the vane extends across behind the tines tends to gather the sand and pull it along with the tines. The collected sand flows through between the tines and as it spills over the upper edge of the vane it distributes behind the implement without leaving any tine marks in the sand. Thus, the implement is capable of filling in deeper marks without leaving a trough mark more quickly because of its more thorough action on the sand, and this is possible with even less pressure on the handle than is required with known types of rakes. The finished working of the sand is also more acceptable because of the lack of any tine marks.

Sand traps tend to be concave, and the fact that the more central tines are slightly deeper than the outer, i.e., the bottom of the tines have a concave outline, the smoothing action in the trap is facilitated.

As was previously indicated, the implement also has features which make it useful as a garden rake. If specially made for use as a garden rake, the head is preferably formed of metal and the lower edge 28 of the vane 15 may be provided with a sharper edge. The vane 15 may in fact be of a thin cross section without a rounded back surface. When pulled through loose soil the vane is capable of severing roots of unwanted plants, but the implement is particularly well adapted for leveling fine seed beds which have already been tilled for planting.

Figure 9:
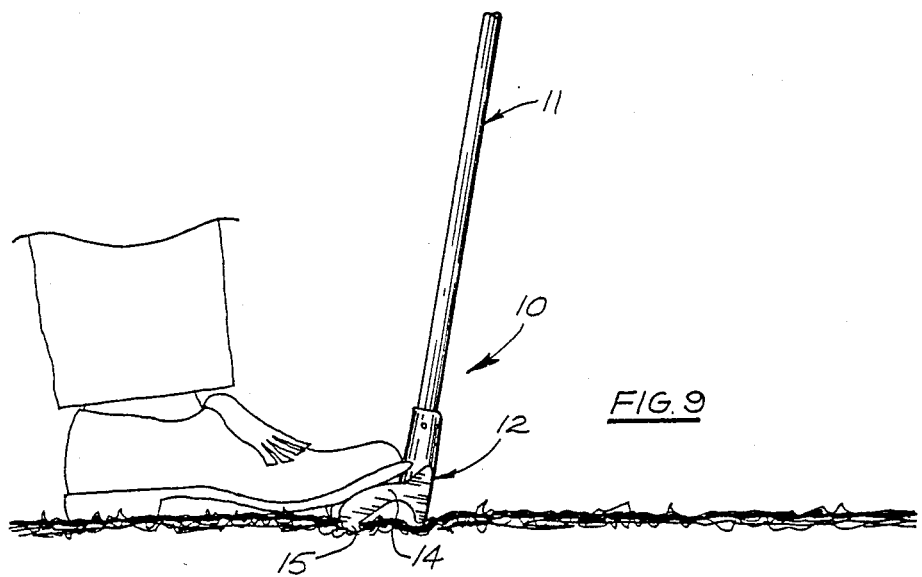
FIG. 9 is a side view similar to FIG. 8, but when activated by foot to force the implement to a raised, more accessible position.

Because of the curved nature of the front and lower edges of the tines and because the lower curved edge of the tines merge into the curved back surface of the vane, no pointed or sharp edges are exposed even when the implement is left on its back as shown in FIG. 8. The sharp lower edge of the vane is disposed only between the tines so that it is virtually impossible to be contacted. The edges 27 of the tines and the vane are positioned rearwardly of the top surface 16 and more particularly the end portions 18 of the main body portion which is in engagement with the ground surface. Thus, when a player places his foot on the tines as indicated at 33 and pushes down, a considerable pivoting action is established so that the rake can be brought smoothly to a more upright position. As the pressure is applied by the foot, normally the raised portion are pushed down into the soil, but the body portion still pivots about the rear edge 19 of the top surface 16. Before the handle reaches an upright position, say about 80° from the ground surface, the vane 15 engages the ground as shown in FIG. 9 so that no further pivoting is accomplished even though pressure may still be applied. This prevents the handle from striking the player if too much pressure has been applied or if one accidentally steps on the rake head.

When the implement is left lying on the ground as shown in FIG. 8, the damage to the grass is minimal because of the portions 17, 17 are the only portions of the head which engage the ground the ground, the flat top surface being held out of engagement to prevent smothering of the grass.

While only a single embodiment of the invention has been described, various modifications will be apparent to those skilled in the art without departing from the spirit of the invention as defined in the appending claims.

What I claim is:

1. A soil dressing implement having a handle and a head, said head comprising a transverse body portion, a plurality of downwardly projecting tines separated by lateral spaces, said tines having front edges inclining downwardly and rearwardly to bottom edges of said tines when said implement is held in a normal working position, and a transverse vane extending the width of the head and having a lower front edge spanning the spaces between said tines and an upper rear edge behind said tines and spaced below said body portion, said upper rear edge being above said lower front edge and being separated therefrom by a front surface of said vane sloping upwardly and rearwardly from said lower front edge to said upper rear edge, said bottom edges of said tines curving downwardly and rearwardly from said front edges of said tines and then upwardly to said lower front edge of said vane.

2. A soil dressing implement having a handle and a head, said head comprising a transverse body portion, a plurality of downwardly projecting tines separated by lateral spaces, said tines having front edges inclining downwardly and rearwardly to bottom edges of said tines when said implement is held in a normal working position, and a transverse vane extending the width of the head and having a lower front edge spanning the spaces between said tines and an upper rear edge behind said tines and spaced below said body portion; said lower front edge and upper rear edge being separated by a substantially flat front surface of said vane sloping upwardly and rearwardly from said lower front edge to said upper rear edge, said vane having a rear curved surface, said bottom edges of said tines curving downwardly and rearwardly from said front edges of said tines and then upwardly to merge smoothly with the rear surface of said vane.

3. An implement as defined in claim 2, wherein said rear curved surface of said vane intersects said flat front surface of said vane to provide at said lower front edge of said vane a sharp front edge extending between said tines.

4. A soil dressing implement having a head and a handle projecting therefrom, said head having a transverse body portion with a top surface terminating at a rear edge opposite to said handle, a plurality of tines separated by lateral spaces and extending downwardly from said head, and a transversely extending vane located behind said tines and spanning the spaces between the tines, said vane having a lower front edge and a rear edge spaced upwardly from said front edge and said tines having front edges inclining downwardly and rearwardly from said body portion to bottom edges of said tines when said implement is held in a normal working position, said bottom edges curving downwardly and rearwardly from said front edges of said tines and then upwardly to the front edge of said vane, said tines projecting upwardly of said body portion and said curved bottom edges being located rearwardly of said rear edge when said implement is lying in an up-side-down position with said handle extending forwardly of said head, whereby downward pressure applied to said curved bottom edges of said tines by a person's foot would cause said implement to pivot to an upright position in which said vane would be engageable with the ground to terminate said pivoting before said handle reaches a vertical position.

5. An implement as defined in claim 4, wherein said bottom edges of said tines curve gradually downwardly and rearwardly from the front edges of said tine and then slightly upwardly to the lower front edge of said vane.

6. An implement as defined in claim 5, wherein said vane has a curved rear surface merging smoothly with the curved bottom edges of said tines.

7. An implement as defined in claim 4, wherein said top surface of said body portion has raised end portions for holding said body portion above the surface of the ground when said implement is lying in said up-side-down position.

8. A soil dressing implement having a head and a handle projecting therefrom, said head having a transverse body portion with a top surface terminating at a rear edge opposite to said handle, said body portion having a cylindrical socket for receiving one end of said handle, said socket having a bore communicating with an inner end thereof, said bore receiving a spike projecting from said body portion substantially coaxial with said socket whereby the forcing of said spike into the ground, holds said implement with the handle projecting substantially vertically upwards, a plurality of tines extending downwardly from said head, said tines having curved bottom edges, said tines projecting upwardly of said body portion and said curved bottom edges being located rearwardly of said rear edge when said implement is lying in an up-side-down position with said handle extending forwardly of said head whereby downward pressure applied to said curved bottom edges of said tines by a person's foot would cause said implement to pivot to an upright position.

* * * * *